UNITED STATES PATENT OFFICE.

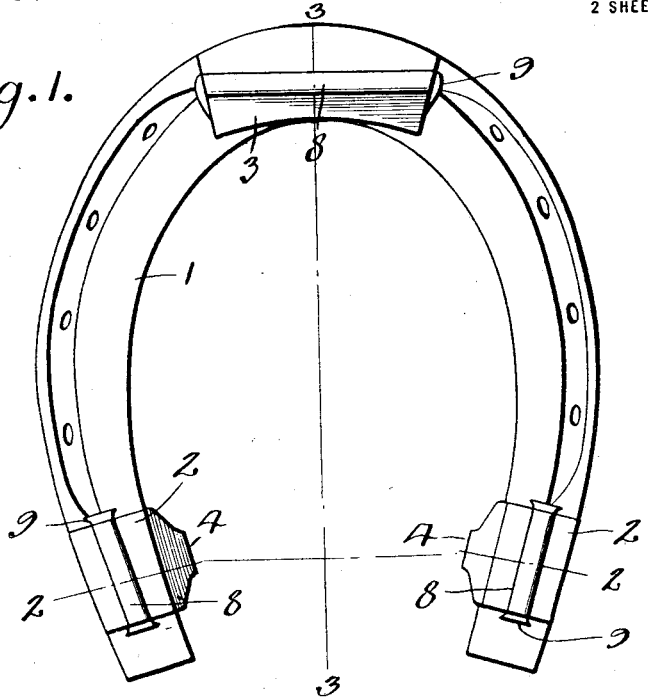
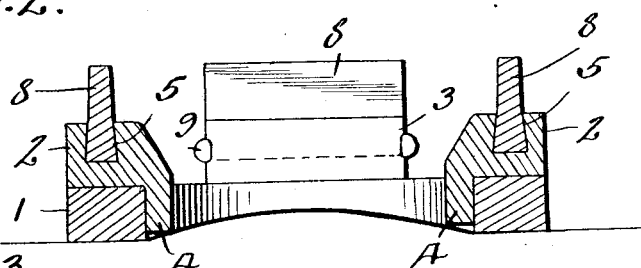
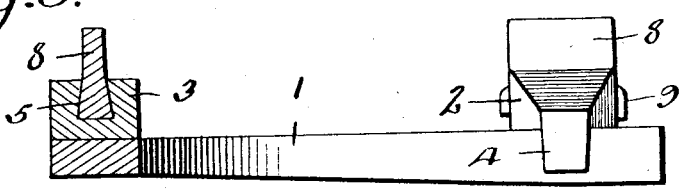
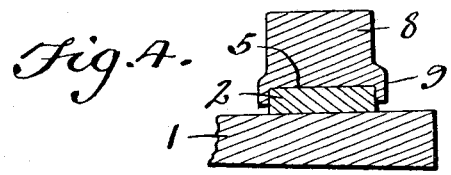

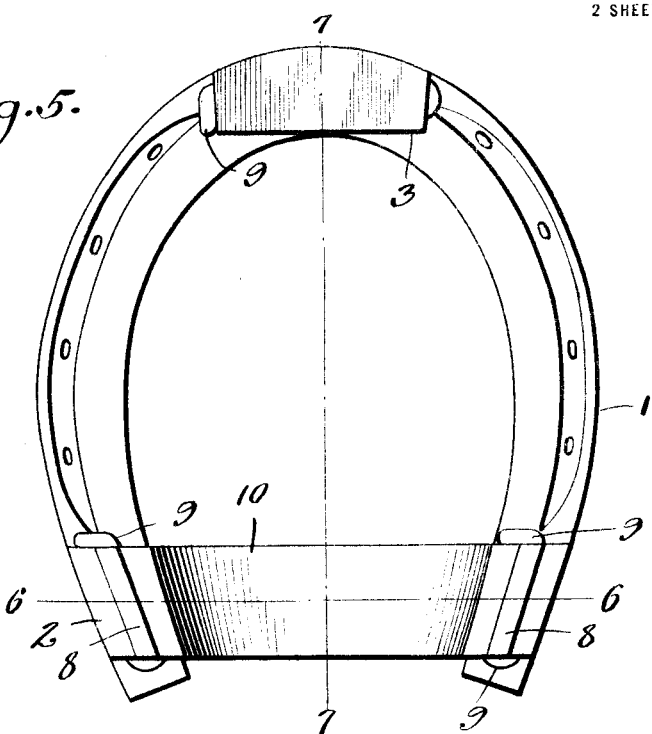
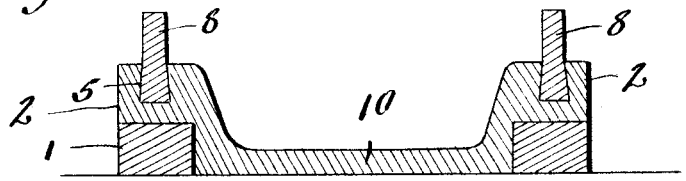
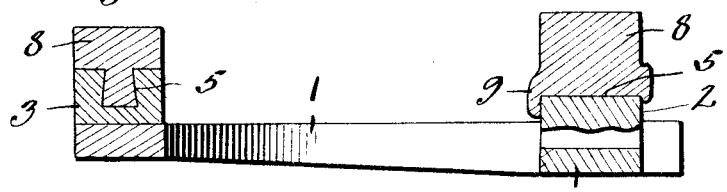
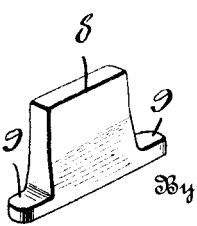

DAVID A. WOLGAMOTT, OF MILLERSBURG, OHIO.

HORSESHOE.

1,181,193.  Specification of Letters Patent. Patented May 2, 1916.

Application filed September 25, 1915. Serial No. 52,711.

*To all whom it may concern:*

Be it known that I, DAVID A. WOLGAMOTT, a citizen of the United States, residing at Millersburg, in the county of Holmes and State of Ohio, have invented new and useful Improvements in Horseshoes, of which the following is a specification.

The present invention relates to improvements in horse shoes.

One of the objects of the invention is to provide a new and improved horse shoe calk which may be easily and quickly fastened to the shoe and removed therefrom when worn off.

A further object of the invention is to provide a horse shoe with a transverse member which is secured to the heel portion of the shoe to provide the same with integral calks, to arrange a similar calk member upon the toe portion of the shoe, all of the said calks having longitudinally arranged substantially dove-tailed slots or openings, providing the wearing faces of the calks with two distinct tread surfaces, and the said slots or recesses providing means whereby removable contact or anti-slipping members may be easily arranged therein and secured thereto.

With the above and other objects in view, the improvement resides in the construction, combination and arrangement of parts set forth in the following specification and falling within the scope of the appended claim.

In the drawings: Figure 1 is a plan view of a horse shoe provided with my improvement, Fig. 2 is a sectional view approximately on the line 2—2 of Fig. 1, Fig. 3 is a sectional view approximately on the line 3—3 of Fig. 1, Fig. 4 is a detail sectional view taken in a line with the center of one of the anti-slipping members, Fig. 5 is a plan view illustrating a modification, Fig. 6 is a sectional view approximately on the line 6—6 of Fig. 5, Fig. 7 is a sectional view approximately on the line 7—7 of Fig. 5, and Fig. 8 is a perspective view of one of the anti-slipping members.

The shoe is of the ordinary formation, but secured thereto at the heel and toe portions thereof, preferably through the medium of integrally formed lugs, are calks 2 and 3 respectively. The inner faces of the calk members may be provided with extensions forming lips 4 which contact with the inner faces of the shoe and each of the calks is formed with a longitudinally extending groove, the opposite walls of which being angular so that each of the grooves, indicated by the numerals 5, is of a substantially dove-tailed formation. This arrangement, it will be noted, provides the outer or bearing faces of the calks with two distinct wearing surfaces, so that the liability of slipping of the animal upon which the shoe is arranged will be materially lessened.

The numerals 8 designate the anti-slipping members which have their lower edges of a dove-tailed formation in cross section, and extended beyond the ends of the body to provide bendable members 9, and these members are adapted to be bent or forced into contact with the opposite sides of the calks after the dovetailed portion thereof has been received in the dovetailed groove of the calk.

If desired, and as illustrated in Figs. 5 to 7 of the drawings, the heel calks may be provided with a connecting member 10, the calks proper being formed with a longitudinal groove heretofore described, the said grooves receiving anti-frictional members which, as previously stated, have their ends constructed of malleable material, so that the same may be bent against the ends of the calks and further, if desired, the anti-frictional member 10 attached to the front calk may be of a size equaling that of the said front calk, or in other words, the said front anti-frictional member is not provided with a sharpened or entering surface as is the remainder of the anti-frictional members.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

The combination with a horse shoe, calks secured to said horse shoe adjacent the free ends thereof, each of said calks being provided with grooves, anti-slipping elements mounted in said grooves, right-angularly disposed lips formed on the confronting faces of said calks, and a bar connecting the free ends of the lips.

In testimony whereof I affix my signature in presence of two witnesses.

DAVID A. WOLGAMOTT.

Witnesses:
W. F. GARVER,
IRENE R. CLOSE.

Copies of this patent may be obtained for five cents each, by addressing the "Commissioner of Patents, Washington, D. C."